Sept. 19, 1950 R. S. HATCH ET AL 2,522,947
APPARATUS FOR GROWING AEROBIC ORGANISMS
Original Filed May 16, 1945

INVENTOR
RAYMOND S. HATCH AND
BY RICHARD N. HAMMOND
ATTORNEYS

Patented Sept. 19, 1950

2,522,947

UNITED STATES PATENT OFFICE 2,522,947

APPARATUS FOR GROWING AEROBIC ORGANISMS

Raymond S. Hatch and Richard N. Hammond, Longview, Wash., assignors to Weyerhaeuser Timber Company, Longview, Wash., a corporation of Washington Original application May 16, 1945, Serial No. 594,082. Divided and this application March 27, 1947, Serial No. 737,616

1 Claim. (Cl. 195—143)

This invention relates to the propagation of yeasts, molds, fungi and other organisms which require large amounts of atmospheric oxygen for their development when grown in liquid substrates, and more particularly to an apparatus for promoting rapid and efficient growth of such organisms.

This application is a division of our co-pending application Ser. No. 594,082 filed May 16, 1945, now Patent 2,482,908.

The production of baker's yeast and brewer's yeast, which are representative of the types of organisms mentioned, has, for many years, followed certain conventional practice involving the aeration, in suitably constructed tanks, of a liquid substrate by forcing air through perforated pipes or diffusing elements disposed in the bottoms of the tanks. The amount of air which can be forced through a liquid substrate in conventional yeast propagating equipment is, to a large extent, limited by foaming conditions and by the power required to force air under a substantial head through the layer of liquid. Furthermore, it is general practice to use a foam-dispersing agent such as a fat or oil to limit excessive foam formation. These foam-dispersing agents tend to contaminate the yeast and add to the cost of yeast production. Furthermore, because it is not possible economically to force the required amount of air through the substrate to obtain ideal rates of growth, the time required for growth is relatively long, and a large tank capacity is necessary when large production is required.

It is the object of the present invention to provide an apparatus for accelerating the growth of aerobic organisms, thereby facilitating production for commercial purposes.

Another object of the invention is the provision of an apparatus for propagating aerobic organisms with a minimum of power input and consequent operating cost.

A further object of the invention is the provision of an apparatus in which large quantities of air are intimately mixed with the substrate and the use of oily foam-dispersing agents is avoided.

Figure 1:
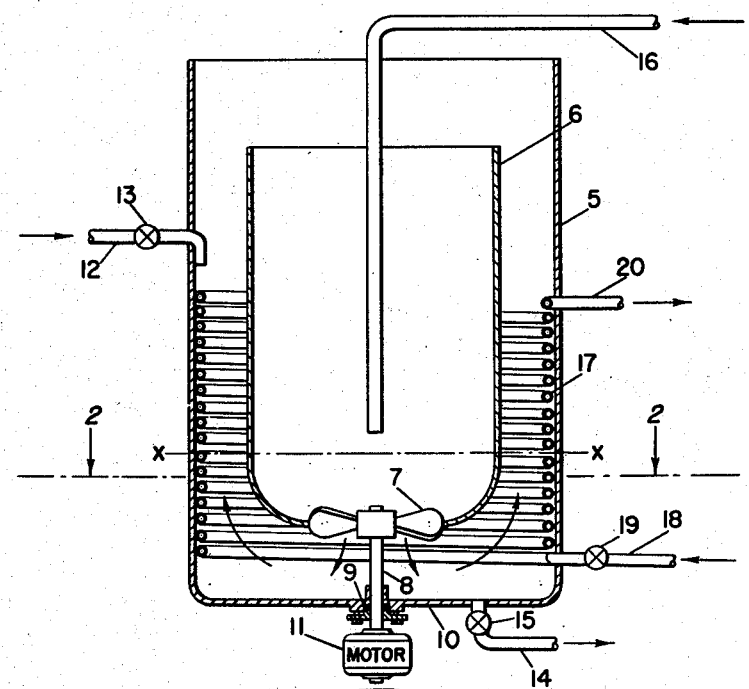
Figure 2:
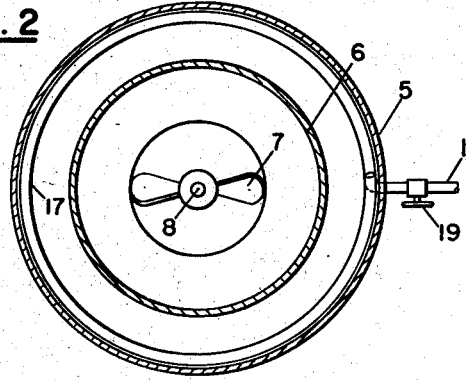

Other objects and advantages of the invention will be apparent as it is better understood by reference to the following specification and the accompanying drawing, in which:

Fig. 1 is a vertical section through an apparatus suitable for the practice of the invention; and Fig. 2 is a horizontal section on the line 2—2 of Fig. 1.

Referring to the drawing, 5 indicates a suitable receptacle or tank, preferably of cylindrical form. Within the tank 5, a second receptacle or draft tube 6 is supported. The cross-sectional area of the draft tube 6 is preferably approximately one-half the cross-sectional area of the tank 5. The lower end of the draft tube 6 is constricted to an opening in which a propeller 7 is disposed. The propeller is mounted on a shaft 8 extending through a gland 9 in the bottom 10 of the tank 5. The shaft 8 may be driven by a motor 11 directly connected thereto or by any other suitable driving mechanism.

An inlet pipe 12 controlled by a valve 13 is provided for the purpose of introducing the substrate with the necessary inoculum and nutrients. An outlet pipe 14, controlled by a valve 15, is connected to the bottom of the tank 5 to permit withdrawal of the substrate after the organism has been propagated therein. A pipe 16 extends to a point near the bottom of the draft tube 6 for the purpose of introducing fresh air which may be supplied by a blower (not shown) or in any other suitable manner. Since it may be desirable to reduce the temperature of the substrate during propagation of the organism, a coil 17 may be provided on the inner wall of the tank 5 and supplied with any suitable cooling medium through a pipe 18 controlled by a valve 19. The cooling medium escapes through a pipe 20. The cooling coil is not, however, essential in all operations and may be eliminated.

In the operation of the apparatus as described, a liquid substrate is delivered to the tank 5, together with the necessary inoculum and nutrients, to approximately the level indicated by the dotted line, x—x, that is, to a level of approximately one-quarter of the full depth of the tank 5. The propeller 7 is then started. The blades are set to force the liquid downwardly and outwardly as indicated by the arrows. The rapid revolution of the propeller draws the liquid downwardly from the draft tube 6 and raises the level in the tank 5 surrounding the draft tube. As soon as this result is effected, large quantities of air are drawn through the draft tube and forced into the substrate in the tank 5, so that the organisms in the substrate are supplied with the necessary oxygen at a rapid rate. Considerable foaming results. The foam rises in the annular space between the draft tube 6 and the wall of the tank 5 until it reaches the top of the draft tube. It then spills over the top of the draft tube and returns by gravity to the propeller at the base thereof. As the mixture of foam and liquid cascades in a thin layer down the inside wall of the draft tube 6, much of the foam breaks and disappears before it reaches the propeller.

The air at low pressure, introduced through the pipe 16, ensures the presence of an ample supply of air to be mixed with the substrate in the manner hereinbefore described. It also sweeps out of the interior of the draft tube 6 any gaseous products of metabolism resulting from the growth of the organism. If it is desirable to control the temperature of the substrate within optimum growing conditions, such control can be effected readily by supplying a suitable cooling agent at the proper temperature through the pipe 18. In many operations, such cooling is unnecessary.

When the desired propagation has been effected, the substrate can be withdrawn through the pipe 14 and subjected to centrifugal action for the removal of a concentrated yeast slurry. Fresh substrate, with the necessary inoculum and nutrients, can then be introduced so that the operation is repeated.

In the propagation of certain types of yeast, the growth is so rapid that the apparatus described may be operated in a semi-continuous manner. In such operation, after growth has been started, approximately one-quarter of the substrate is withdrawn at the end of each hour and replaced by fresh substrate containing the necessary nutrients. The substrate withdrawn is subjected to centrifugal action for the removal of a concentrated yeast slurry. After another hour, a similar proportion of the substrate is withdrawn and replaced with fresh material.

The apparatus may also be used in a fully continuous operation, provided the original charge of substrate and inoculum is first allowed as sufficient growth period to develop an active growth of the organism. It is then possible to add a continuous stream of fresh substrate containing the proper nutrients at a fixed rate through the pipe 12 and at the same time withdraw the substrate containing the organism at the same rate at which it is being added through the pipe 14. Under such operating conditions, there is a slight loss in yield, but when operating with waste materials such loss is frequently advisable to avoid excessive investment in equipment.

The apparatus as described affords a substantial improvement in the propagation of yeasts and the like, particularly in respect to the time required. Where, under the conventional methods, growth will normally require periods of from twelve to forty-eight hours, the improved method reduces the time of growth to about one-third of that otherwise necessary. It is possible, moreover, to work with solutions of much higher nutrient concentration because of the much more rapid utilization of atmospheric oxygen in the method described. The apparatus also effects a material saving in power consumption, since the operation of the propeller requires much less power than is needed to blow similar quantities of air through the substrate. In describing the apparatus, we have given certain dimensional relationships of the different elements, but the invention is not confined thereto, and various changes may be made in the details of the apparatus and in the method of procedure without departing from the invention or sacrificing the advantages thereof.

We claim:

In an apparatus for improving the propagation of aerobic organisms, an outer receptacle, an inner receptacle having a closed vertical wall with a lip below the level of the upper edge of the outer receptacle and a semi-spherical bottom with an opening centrally disposed therein, a power-driven propeller mounted in the opening, an air tube having its discharge end positioned within the inner receptacle, substantially at the center thereof and at a point contiguous to the propeller, valve-controlled pipes for introducing liquid to and for withdrawing liquid from the outer receptacle, and a coil for the passage of cooling liquid in the space between the vertically-extending walls of the inner and outer receptacles.

RAYMOND S. HATCH.
RICHARD N. HAMMOND.

REFERENCES CITED

The following references are of record in the file of this patent:

UNITED STATES PATENTS

| Number | Name | Date |
| --- | --- | --- |
| 328,585 | Hornbostel | Oct. 20, 1885 |
| 1,876,994 | Mann | Sept. 13, 1932 |
| 1,982,002 | Hatch | Nov. 27, 1934 |
| 2,111,726 | Plews | Mar. 22, 1938 |
| 2,244,902 | Stich | June 10, 1941 |
| 2,298,561 | Hendrickson | Oct. 13, 1942 |